(No Model.) 2 Sheets—Sheet 1.
J. C. PEATIE.
Truck.
No. 235,647. Patented Dec. 21, 1880.
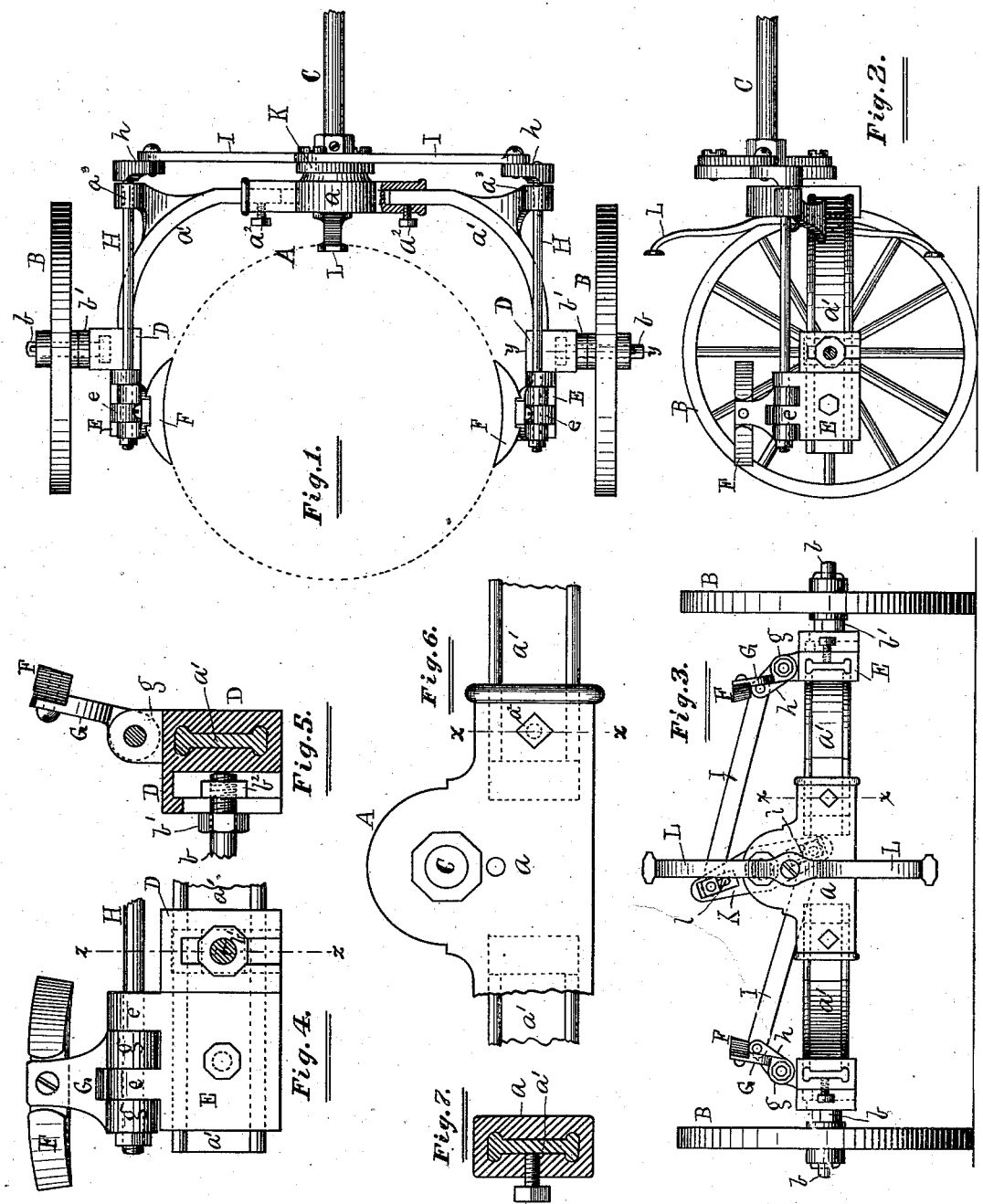
Attest:
S. P. Hollingsworth
Nathan C. Lane
Inventor:
John C. Peatie
By Coyne and Elliott
Attorneys.

(No Model.) 2 Sheets—Sheet 2.
J. C. PEATIE.
Truck.
No. 235,647. Patented Dec. 21, 1880.
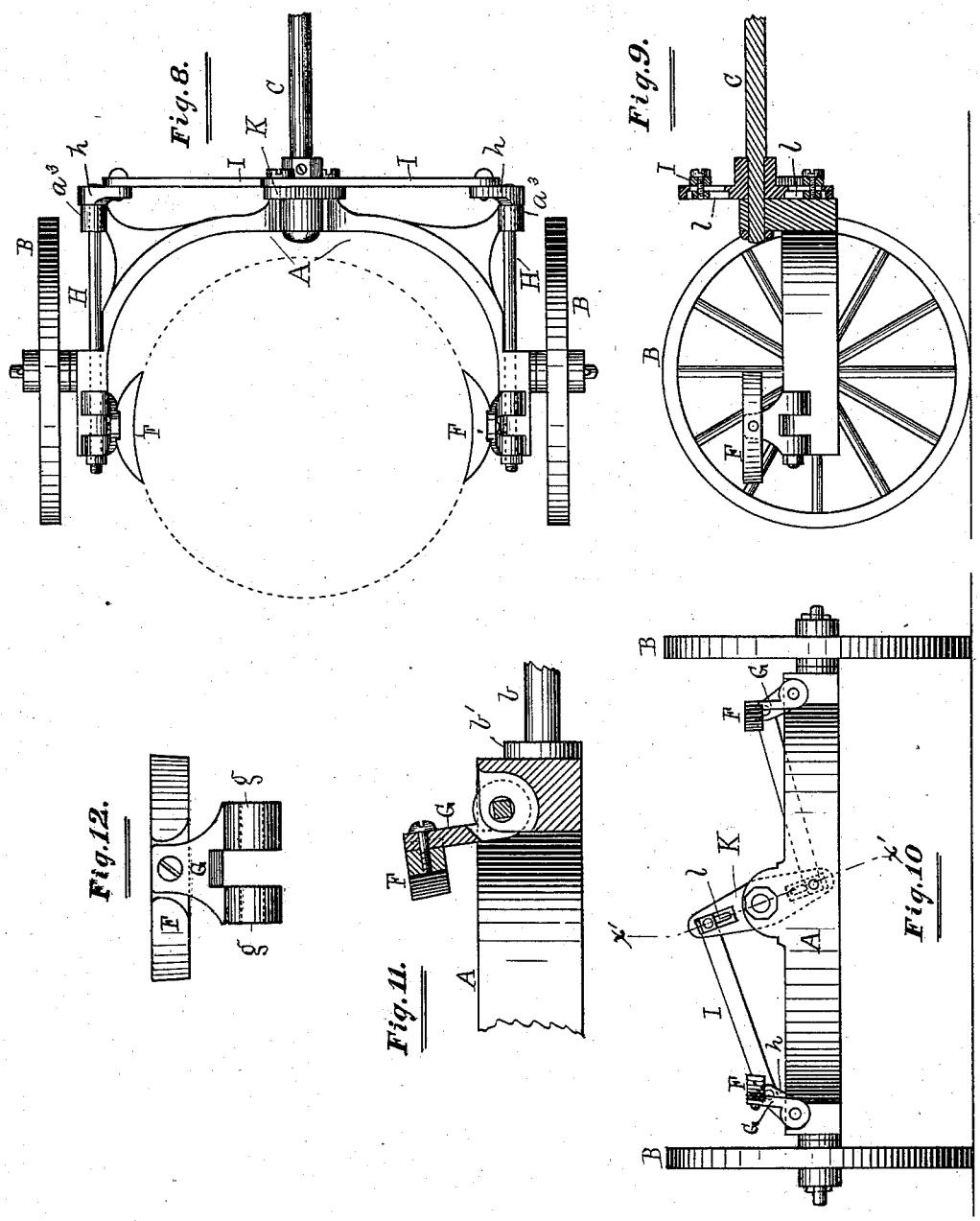
Attest:
Sidney P. Hollingsworth
Nathan C. Lane
Inventor:
John C. Peatie
By Coyne and Elliott
Attorneys.

UNITED STATES PATENT OFFICE.

JOHN C. PEATIE, OF CHICAGO, ILLINOIS.

TRUCK.

SPECIFICATION forming part of Letters Patent No. 235,647, dated December 21, 1880.

Application filed May 11, 1880. (No model.)

*To all whom it may concern:*

Be it known that I, JOHN C. PEATIE, of Chicago, in the county of Cook and State of Illinois, have invented certain new and useful Improvements in Trucks, of which the following is a specification.

This invention relates to trucks adapted for lifting and carrying barrels, &c., and other articles of similar shape; and its object is to provide means for grasping an up-ended barrel, &c., as it rests upon its end, so as to lift and hold it in an upright position while transporting it from one place to another.

A further object is to provide means for adjusting a truck for this purpose to barrels and other similar articles differing in either height or circumference, or both; and, finally, to prevent the barrel from rocking when suspended in the trucks.

In the accompanying drawings, in which similar letters of reference indicate the same parts, Figure 1 is a plan view of a truck embodying my invention; Fig. 2, a side elevation of the same with one of the wheels removed; Fig. 3, a front elevation; Fig. 4, a detail side elevation, showing the pivoted and hinged clamping-plate and the adjustment of the axle; Fig. 5, a cross-section on the line $z$ $z$ of Fig. 4; Fig. 6, a front elevation, on an enlarged scale, of the head-block carrying the adjustable side bars and the tongue; Fig. 7, a cross-section on the line $x$ $x$ of Figs. 3 and 6; Fig. 8, a plan view of a modification of my truck; Fig. 9, a longitudinal section on the line $x'$ $x'$ of Fig. 10; Fig. 10, a front elevation of my modification; Fig. 11, a vertical transverse sectional detail of one of the clamping-plates and of the side bar to which it is hinged, and Fig. 12 a side elevation of the clamping removed from the trucks.

A represents the frame, B B the wheels, and C the tongue, of my truck.

The frame A consists of a head, $a$, provided at its center of length with a perforated enlargement to receive and hold the tongue C, said head having its ends hollowed, as shown in Fig. 1 and indicated in dotted lines in Figs. 3 and 6, to receive the sides $a'$ $a'$, said bars being adjustable in the head, so as to lengthen or shorten the frame, as well as increase or diminish its diameter, and are held in position by set-screws $a^2$ $a^2$. These side bars are curved about their center of length, as shown, to give them greater strength in the line of draft, and terminate in straight ends, for the purpose of rigidity in adjustment and to enable the expansion or contraction of the arc of the circle which they describe, as well as for convenience in attaching the blocks supporting the wheels and the clamping-plates, said bars being also provided with perforated lugs $a^3$ $a^3$, the purpose of which will be hereinafter described.

Toward the rear ends of the side bars are supports for the axles $b$ $b$ of the wheels B B, said supports consisting of blocks D D, provided with longitudinal perforations corresponding with and of sufficient size to enable the blocks to fit closely when slipped upon the side bars, as indicated in Fig. 5, in which position they may be held by set-screws or other suitable means.

The outer side of each of the blocks D D is provided with an elongated T-groove, closed at the top, but opening at the bottom, of said block, to not only receive but admit of the vertical adjustment of the frame upon the axles, as clearly indicated in Fig. 5. These axles are provided with shoulders or nuts $b'$ $b'$, and screw-threaded upon their inner ends to receive nuts $b^2$ $b^2$, to clamp the frame to them at any desired point in the T-groove of the blocks D D.

E E are blocks held upon the rear ends of the side bars in the same manner as the T-grooved block, and are provided with upwardly-extending perforated lugs $e$ $e$.

F F are clamping-plates, concave upon their inner faces to conform to the circumference of the barrel, and pivoted at their center of length to straps G G, having lugs $g$ $g$, and hinged upon the blocks E E by horizontal rods H H passing through the lugs of the strap and block. These rods extend forward, and, passing through the lugs $a^3$ $a^3$, are provided upon their forward ends with cranks $h$ $h$, to the ends of which are pivoted levers I I.

The pivoted tongue C has rigidly secured to it, upon the outside of the frame, a double crank, K, having near each of its ends elongated slots $l$ $l$, in which, by means of bolts and nuts, are adjustably secured the ends of the levers I I. From this construction it will be seen that by adjusting the levers toward or from the axis of the double crank their length of stroke will be varied, and consequently the play of the clamping-plates be diminished or increased, as desired or is necessary to properly adjust them to the barrel, the tongue being the medium through which the power is applied for operating them. It is, however, desirable to have the clamping-plates at an angle—i.e., inclined toward the center of width of the frame (see Figs. 3 and 5)—so that, no matter how loosely they are clamped upon the barrel, the gravity and weight of the latter will cause them to move toward each other and automatically tighten themselves upon the barrel when lifting it from the ground. Furthermore, by having the clamping-plates thus inclined toward each other the downward pressure of the weight of the barrel, and consequently the tightening of the clamps, will prevent the accidental detachment of the clamps by a power which would otherwise turn the tongue and release them. As these clamping-plates are pivoted to the straps, they will readily adjust and maintain themselves at a right angle to the length of the barrel at whatever angle the frame of the truck may be while lifting or trundling the barrel away, thereby avoiding any slipping of the latter and maintaining it in a vertical position at all times while on the truck.

In operating my trucks it is essential that the clamps should catch the barrel below its bulge, and to adjust them for this purpose the free end of the tongue is elevated to lower the clamps, which, if found too low or too high, may be adjusted by raising or lowering the frame upon the axle to the required position. The side bars are then moved inwardly or outwardly in the head until the required breadth of frame is obtained to enable the clamps to operate with effect, when, by turning the tongue, the levers will cause the clamps to grasp the barrel, and a turn in the opposite direction causes them to release it.

To prevent the barrel from rocking when held by the clamp, I have secured a curved spring, L, to the inner front side of the frame A. This spring is bolted at its center of length, and in a vertical position, and is of sufficient length to cause its ends to press against the sides of the barrel near its top and bottom, thus steadying the barrel in the clamp against any sudden jerk or jar which would otherwise throw it out of its vertical position, or perhaps out of the clamps.

Although the vertical and horizontal adjustment of the frame as above described is desirable, it is obvious that where only a certain size of barrel is to be handled the devices for such adjustment may be omitted and the frame be made of a single and continuous piece, with the pivoted clamping-plates hinged directly to it, either with or without having the double crank slotted for the adjustment of the levers, (see Figs. 8, 9, 10, and 11,) without departing from the spirit of my invention.

By my construction the operator is not required to touch the barrel, and may load, trundle away, and unload the same without assistance or removing his hands from the tongue, and may quickly and easily adjust the trucks to barrels of differing size, thus adapting to general use an article of this class.

Having thus described my invention, what I claim, and desire to secure by Letters Patent, is—

1. In barrel-trucks, the combination, substantially as hereinbefore described, of the frame A, hinged clamping-plates F F, and pivoted tongue C, connected with said plates and operating the same, as and for the purpose set forth.

2. The combination, with the frame, the clamping-plates, and the tongue constructed as described, of the spring L, substantially as and for the purpose set forth.

3. The clamping-plates F F, pivoted tongue C, rods H H, and levers I I of the double crank K, slotted as described, whereby said plates may be maintained at an inclined angle toward each other and their length of stroke varied, as described and shown.

4. In barrel-truck frames, the combination, substantially as described, of the hollow head $a$ and curved side bars, $a'$ $a'$, said bars being adjustably held in the hollow head, whereby the breadth and curvature of the frame may be made to conform to barrels of differing diameters.

5. The combination, with the axles of a barrel-truck, of a supporting-frame vertically adjustable upon and secured to said axles, and provided with clamping-plates for grasping the barrel, whereby the truck is adapted for manipulating barrels of different heights.

6. In a truck, the combination, substantially as hereinbefore set forth, of the transversely and vertically adjustable frame, the pivoted and hinged clamping-plates, and a pivoted tongue connected with and operating said plates, as and for the purpose set forth.

JOHN C. PEATIE.

Witnesses:
S. S. SCHOFF,
FOSTER LAMB.